Dec. 29, 1931. H. G. ANDERSON 1,838,728
MEASURING TEMPERATURES
Filed Aug. 30, 1929
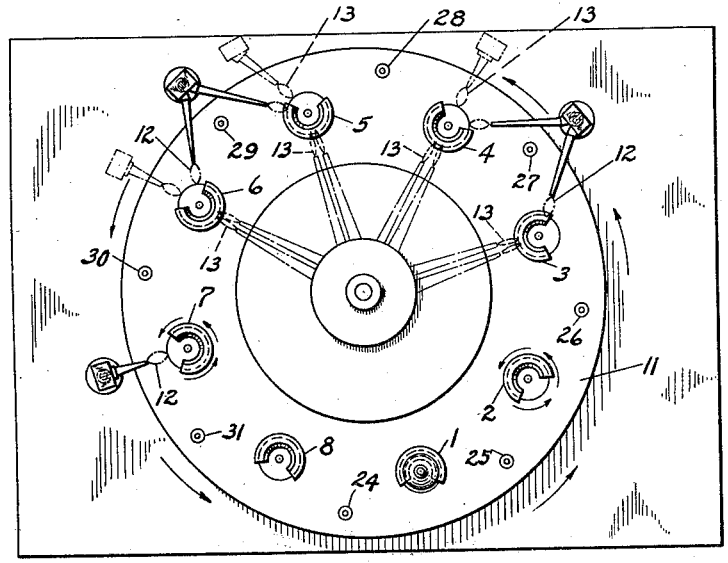
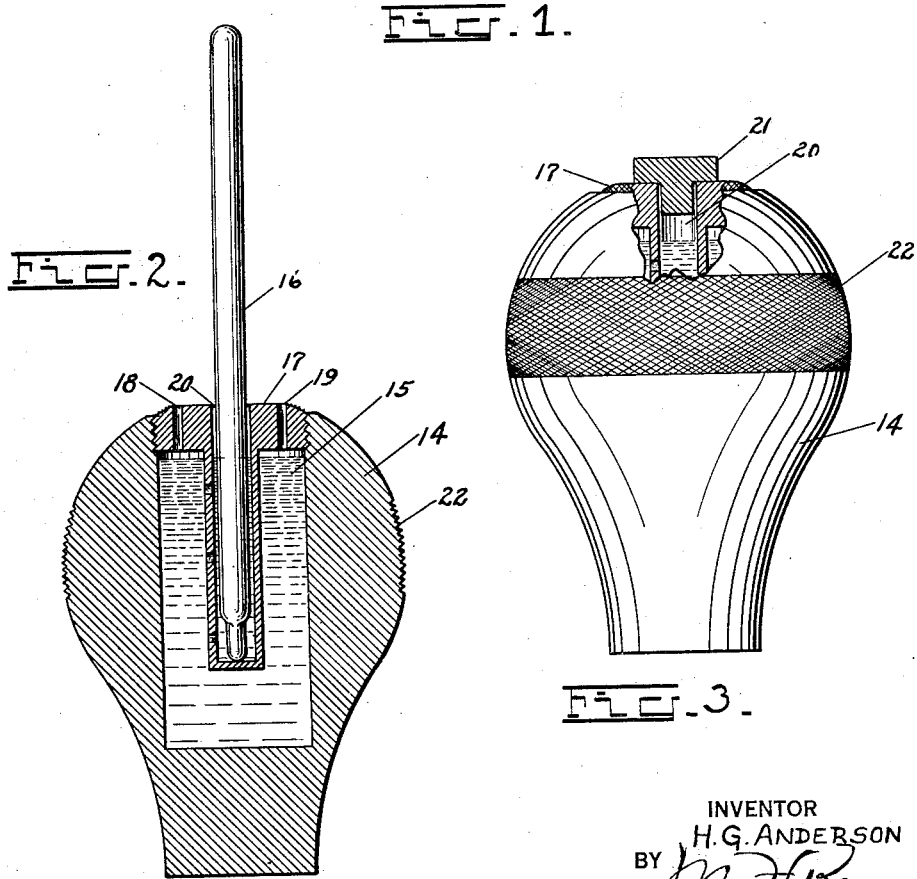
INVENTOR
H.G. ANDERSON
BY
ATTORNEY Patented Dec. 29, 1931

1,838,728

UNITED STATES PATENT OFFICE

HOMER GEORGE ANDERSON, OF CALDWELL, NEW JERSEY, ASSIGNOR TO WESTINGHOUSE LAMP COMPANY, A CORPORATION OF PENNSYLVANIA

MEASURING TEMPERATURES

Application filed August 30, 1929. Serial No. 389,389.

This invention relates to temperature measuring devices and more particularly to temperature measuring devices of the calorimeter type, and has for its object the provision of a suitable type of calorimeter for the measurement of temperatures obtained during the sealing in and exhaust operations in the manufacture of electron discharge devices, gas discharge devices, incandescent electric lamps, radio tubes and like devices.

Another object of this invention is to provide a means of regulating the amount of heat applied to such electrical devices during the assembly, sealing in and exhaust operations in the manufacturing process.

Other objects and advantages will become apparent as the invention is more fully disclosed.

In the manufacture of electron discharge devices, gas discharge devices, incandescent lamps and the like devices it is highly essential that the enclosing glass envelope be substantially freed of deleterious surface adsorbed films of grease, atmospheric gases, moisture and the like impurities. It is customary to heat the glass envelope to elevated temperatures during the sealing in and exhaust operations so as to effect substantial vaporization and removal of these impurities. The manner of effecting this heating varies with the different types of electrical devices being manufactured, and also with the particular manufacturing apparatus employed. It is highly essential, however, that accurate control over these temperature conditions be maintained in order that the elimination of these impurities be made substantially efficient.

In order to effect this desired temperature control I have devised a novel type of calorimeter, comprised substantially of a heat absorbing metal body, shaped in the same configuration as the specific electric device being manufactured, within which is centrally located a well of water or similar desirable material of known heat absorbing properties and means are provided for measuring the temperature of said material. The calorimeter is subjected to the heating conditions of the electric device of which it is a counterpart. The temperature differences determined, the actual temperatures may be calculated or approximated and suitable adjustments may then be made in the amount of applied heat energy to effect the desired alteration thereof.

As a specific embodiment of the practice of my invention I will describe the same as applied in the manufacture of incandescent electric lamps. It is customary in the manufacture of incandescent electric lamps to effect the sealing in and exhaust operations in consecutive steps and during such operations it is highly essential that all parts of the glass envelope be maintained at elevated temperatures to prevent the development of deleterious stresses and strains on the sealed in portion of the envelope during the sealing in operation and to effect substantial vaporization of the adsorbed surface gases and moisture impurities on the inside envelope walls during the exhaust operation.

It is customary during the exhaust step to employ a continuous feed machine having a plurality of exhaust positions into each of which positions the device is automatically moved at predetermined time intervals.

During the sealing in operation the filament mount is positioned centrally within the enclosing glass envelope and the assembly is usually passed through a desired heat zone, such as hydrocarbon gas flames directed at different parts of the envelope to effect a pre-heating of the glass parts. To avoid local overheating the device is rapidly rotated, and the fires directed at the envelope adjacent the flare of the mount are increased in intensity until fusible union of the flare with the envelope is obtained.

It is customary to apply to the lamp filament prior to sealing in, a readily volatile "getter" composition comprised of red phosphorous and an inorganic inert material such as "cryolite" which, subsequent to exhaust, is vaporized to effect substantial removal of residual deleterious atmospheric gases, such as oxygen, moisture and the like. It is apparent therefore that the temperature within the device during the preheating step in the exhaust operation must not be high enough to effect vaporization of the phosphorous getter or deterioration of the same by premature interaction with atmospheric gases, as in either event the subsequent life and efficiency of the device will be materially affected.

Before further disclosing the nature of my invention reference should be made to the accompanying drawings wherein Fig. 1 discloses diagrammatically one type of sealing in and exhaust machine having eight sealing in and exhaust positions, commonly known in the art as a Sealex machine.

Fig. 2 is a cross sectional view of a calorimeter constructed in accordance with my invention in the configuration of an incandescent lamp bulb of the tipless type known to the trade as a 60 watt 115 volt lamp.

Fig. 3 is a side elevational view of the same calorimeter with the upper well portion broken away to show the completed appearance of the calorimeter.

Referring to Fig. 1, it is customary to place the mount 10 to be sealed-in, in loading position 1, with the enclosing glass envelope inverted thereover from which position it is moved counter-clockwise by a part revolution of the machine 11 to position marked 2, from thence the assembly 10 is moved by another part revolution of the machine 11 to preheat position 3, in which position preheating of the enclosing glass envelope is initiated, which in the present instance, is accomplished by gas flames 12 and 13, impinging upon the outer surface of the glass envelope.

To avoid local overheating of the envelope the device is rapidly rotated as indicated by the arrows. The gas flames 12 drawn in heavy lines are directed against the top portion of the bulb and the gas flames 13, in dotted lines are directed against the bottom portion of the bulb or enclosing glass envelope adjacent where the flare of the filament mount contacts with the enclosing glass envelope.

At certain predetermined intervals the device is rotated to the successive sealing in positions 4 and 5 during which the lower fires 13 are increased sufficiently in intensity to fusibly unite the flare of the filament mount with the neck of the enclosing glass envelope and to cut off the outlet and thence the device is moved to position 7 where the seal is cooled and to position 8 where the device is ready for the exhaust cycle. The device is removed from the sealing in position when rotated back to the load and unload position 1, and the exhaust tube of the stem inserted in exhaust position 24, from which position the device is subjected to the usual 8 position exhaust cycle 24 to 31 inclusive, and at 31 the exhaust tube of the device is tipped off.

The proper regulation of the pre-heat flames 12 and the sealing in fires 13 is highly essential and has heretofore been extremely difficult to obtain. By the use of the type calorimeter shown in Figs. 2 and 3 I may, however, accurately control these temperatures.

A calorimeter constructed in accordance with my invention is comprised of a mass of a metal of good heat conductivity 14 such as brass, copper, aluminium, iron or the like, which is shaped so that the outside surface contour is the same as the specific type of lamp being exhausted. In the center of the mass of metal is a well 15 arranged to hold in this instance a fluid medium such as water into which may be inserted a suitable temperature measuring device such as a thermometer 16.

To provide means for centrally locating the mercury bulb of the thermometer within the well 15 and to insure a constant displacement of the fluid medium as a result of the insertion of the thermometer 16 within the well 15, a tubular perforated recess closure member 17 is provided which is arranged so as to removably close the open end of the well 15 and orifices 18 and 19 are provided therein for permitting the escape of entrapped air and excess fluid medium in well 15 when the closure member is placed in position and orifice 20 is provided therein of suitable size to permit the thermometer 16 to be inserted within the recessed portion of the closure member.

In Fig. 3, is shown the completely assembled calorimeter with a plug member 21 closing the orifice 20 in the closure member 17. To facilitate handling and opening of the calorimeter the outer perimeter of the metal mass 14 is provided with a knurled band section 22.

The knurled band section is also positioned on the outer perimeter of the calorimeter at an elevation such that the center of the band is approximately at the same height as the center of the filament of a lamp so mounted. Thus the fires directly against the calorimeter may be mechanically adjusted so as to not play upon this knurled section. The outer perimeter of the calorimeter may also be coated with an oxidation resistant material such as chromium, if desired.

In determining the temperatures of the pre-heat fires 12, Fig. 1, the procedure I follow is to assemble the elements of the calorimeter, in the manner shown in Fig. 2, with the thermometer in position, and the temperature of the fluid medium, which in the present instance is preferably water, is first recorded. The thermometer 16 is then removed and the orifice 20 closed by the plug 21 and the calorimeter placed in position 1 of machine 11, Fig. 1. It is then permitted to be passed through the heating fires of the sealing in operation which it is desired to measure or alter.

When position 8 is reached the calorimeter is removed from the machine, the cap 21 removed and the thermometer 16 reinserted. After a short interval of time to allow the mercury in the thermometer to reach the maximum temperature, the temperature of the water is again recorded. The difference between the two temperatures is the temperature gain as a result of the heat energy applied to the calorimeter surface during this specific heating operation.

By altering the fires a difference in heat energy applied to the calorimeter surface may be obtained. This difference is reflected in the temperature rise of the water in the well of the calorimeter.

By correlating the temperature rise obtained in this manner with life test results of lamps exhausted under such temperature conditions, arbitrary temperature conditions may be set up within which best results may be obtained.

To increase or decrease the pre-heat temperatures suitable adjustments may be readily made on the pre-heat fires and relatively accurate measurements of the differences in heat energy as a result of such changes obtained by the use of the calorimeter. While the above specific embodiment of the present invention relates to the manufacture of incandescent lamps it is apparent that the calorimeter device may be readily adapted to be utilized in the manufacture of electronic discharge devices, gas discharge devices, and the like electrical devices wherein accurate control of the heat energy which may be applied to the device at or during any one of the steps of the manufacturing process, is desired.

It is also contemplated that whereas the specific embodiment discloses the use of water as the fluid medium and the temperature recording medium as a thermometer, many combinations of materials may be employed herein and such other combinations of materials may be employed as desired as are dependent in part upon the specific temperature conditions to be encountered.

Such variations and combination of materials are anticipated as may fall within the scope of the following claims:

What is claimed is:

1. The method of determining the temperatures exteriorily applied to incandescent lamps, radio tubes, and the electrical devices during the manufacturing process thereof, which comprises exposing a mass of material of high thermal conductivity to the heating effects of said manufacturing process, said mass being shaped to the approximate configuration of said electrical device and containing an interiorly located material of high thermal absorptivity, the increase in temperature of said interiorly located material of high thermal absorptivity as a result of said thermal diffusion being determined by temperature measuring means in any convenient manner.

2. In the manufacture of incandescent lamps, radio tubes and the like electrical devices, the method of determining the heating temperatures in said manufacturing process, which comprises exposing to the heating temperatures of said process a mass of metal of high thermal conductivity shaped in the configuration of said electrical device and having an inner core of heat absorbing material, and measuring the increase in temperature of said inner core as a result of the heat energy diffused thereto through said mass of metal of high thermal conductivity.

In testimony whereof, I have hereunto subscribed my name this 28th day of August, 1929.

HOMER GEORGE ANDERSON.